United States Patent
Nakashima et al.

(10) Patent No.: US 8,428,792 B2
(45) Date of Patent: Apr. 23, 2013

(54) IN-VEHICLE DEVICE CONTROL SYSTEM

(75) Inventors: Kazuhiro Nakashima, Kariya (JP); Arinobu Kimura, Toyota (JP); Hiroki Okada, Toyota (JP); Hiroko Murakami, Toyota (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 62 days.

(21) Appl. No.: 13/145,838

(22) PCT Filed: Jan. 22, 2010

(86) PCT No.: PCT/JP2010/000349
§ 371 (c)(1),
(2), (4) Date: Jul. 22, 2011

(87) PCT Pub. No.: WO2010/084761
PCT Pub. Date: Jul. 29, 2010

(65) Prior Publication Data
US 2011/0282520 A1 Nov. 17, 2011

(30) Foreign Application Priority Data
Jan. 23, 2009 (JP) .................................. 2009-013456

(51) Int. Cl.
*G06F 17/00* (2006.01)

(52) U.S. Cl.
USPC ............. 701/2; 701/36; 340/5.61; 340/12.28; 340/13.27; 455/509; 180/287

(58) Field of Classification Search ................ 701/2, 36; 340/5.6, 5.61, 12.22, 12.28, 13.27; 455/509; 307/10.2; 180/287
See application file for complete search history.

(56) References Cited

U.S. PATENT DOCUMENTS

| | | | | |
|---|---|---|---|---|
| 6,005,508 A | * | 12/1999 | Tsui | 341/173 |
| 6,323,566 B1 | * | 11/2001 | Meier | 307/10.2 |
| 7,602,274 B2 | * | 10/2009 | Lee et al. | 340/10.2 |
| 8,138,894 B2 | * | 3/2012 | Kato et al. | 340/12.28 |
| 2006/0132325 A1 | * | 6/2006 | Fujii et al. | 340/825.69 |

(Continued)

FOREIGN PATENT DOCUMENTS

| | | |
|---|---|---|
| JP | 2003-138817 A | 5/2003 |
| JP | 2008-60942 | 3/2008 |

(Continued)

OTHER PUBLICATIONS

International Search Report and Written Opinion of the ISA for PCT/JP2010/000349, ISA/JP, mailed Apr. 6, 2010.

*Primary Examiner* — Russell Frejd
(74) *Attorney, Agent, or Firm* — Harness, Dickey & Pierce, PLC

(57) ABSTRACT

In an in-vehicle device control system, a vehicle-side unit mounted in a vehicle controls an in-vehicle device in accordance with a result of checkup about a portable device performed by mutual communications, in which the portable device returns a response signal in response to a request signal transmitted from the vehicle-side unit. An ECU of the vehicle-side unit checks whether it is a regular checkup timing, and performs an exterior checkup if it is determined to be the regular checkup timing. The ECU sets in this case a communication frequency, which is higher in priority order, as a communication frequency to be designated to the portable device.

20 Claims, 7 Drawing Sheets

U.S. PATENT DOCUMENTS

| | | | |
|---|---|---|---|
| 2006/0202798 A1* | 9/2006 | Baumgartner et al. | 340/5.61 |
| 2008/0174446 A1* | 7/2008 | Ghabra et al. | 340/825.01 |
| 2008/0186131 A1 | 8/2008 | Hanai et al. | |
| 2008/0186132 A1* | 8/2008 | Ikeo | 340/5.7 |
| 2011/0102138 A1* | 5/2011 | Girard et al. | 340/5.61 |
| 2011/0102139 A1* | 5/2011 | Girard et al. | 340/5.61 |

FOREIGN PATENT DOCUMENTS

| | | |
|---|---|---|
| JP | 2008-190173 A | 8/2008 |
| JP | 2008-190244 A | 8/2008 |
| JP | 2008-255679 A | 10/2008 |

* cited by examiner

IN-VEHICLE DEVICE CONTROL SYSTEM

CROSS-REFERENCE TO RELATED APPLICATIONS

This application is a 371 U.S. National Stage of International Application No. PCT/JP2010/000349, filed Jan. 22, 2010. This application claims priority to Japanese Patent Application No. 2009-013456, filed Jan. 23, 2009. The disclosures of the above applications are incorporated herein by reference.

TECHNICAL FIELD

The present invention relates to an in-vehicle device control system.

BACKGROUND ART

As one exemplary conventional in-vehicle device control system, a vehicular electronic key system (verification system) is disclosed in the following patent document 1. In this vehicular electronic key system, a control apparatus mounted in a vehicle performs checkup about a portable device carried by a user of the control apparatus by mutual radio communication, and controls the in-vehicle device based on a result of the checkup. This vehicular electronic key system includes a smart security control apparatus mounted in a vehicle and a portable device carried by a user of the control apparatus. The smart security control apparatus transmits to the portable device a designation request signal, which designates a response frequency. When no radio signal is received within a predetermined allowable time period after transmission of the designation request signal, the smart security control apparatus transmits a designation request signal by changing the response frequency to a different frequency. The portable device selects the response frequency designated by the designation request signal and transmits to the smart security control apparatus a reception response signal of the selected response frequency. It is prevented that the response signal is not received because of jamming of the response signal. By thus making the radio communication to be less susceptible to influence of factors such as jamming, which disturb radio communication, a control object can be operated normally.

However, in case of transmitting from the vehicle to the portable device at a fixed time interval the request signal, which requests transmission of the response signal, the request signal need be transmitted a plurality of times at the fixed time interval for designating a plurality of response frequencies. To make the radio communication to be less susceptible to influence of factors such as jamming, which disturb radio communication, the number and time of communications will possibly increase, resulting in increased current consumption. The vehicle is at rest in many instances, when the request signal is transmitted from the vehicle to the portable device periodically. If the current consumption increases under this situation, more and more battery power is consumed.

PRIOR ART DOCUMENT

Patent Document

Patent document 1: JP 2008-190173A

SUMMARY OF THE INVENTION

The present invention addresses the foregoing problems and has an object of providing an in-vehicle device control system, which is capable of suppressing current consumption while making a radio communication to be less susceptible to influence of factors such as jamming.

An in-vehicle device control system according to a first aspect of the present invention comprises a portable device and a vehicle-side unit. The vehicle-side unit is mounted in a vehicle for performing a checkup operation about the portable device based on mutual communication, in which the portable device returns a response signal in response to a request signal transmitted from the vehicle-side unit, for controlling an in-vehicle device based on a checkup result of the checkup operation, and for switching a communication frequency for the mutual communication if the checkup result indicates an unsuccessful checkup, thereby to perform the checkup operation again. The portable device receives the request signal transmitted from the vehicle-side unit in the mutual communication with the in-vehicle device. The portable device includes a portable device communication section for returning the response signal including an ID code by a communication frequency designated by the vehicle-side unit. The vehicle-side unit includes a frequency setting section for setting the communication frequency, which is to be designated to the portable device, among a plurality of communication frequencies having respective priority orders, which are set in correspondence to possibility of successful checkup. The vehicle-side unit includes a vehicle-side communication section for performing the mutual communication with the portable device by transmitting to the portable device the request signal including frequency information indicating the communication frequency set by the frequency setting section and receiving the response signal from the portable device. The vehicle-side unit includes a checkup section for performing the checkup operation based on the ID code included in the response signal received from the portable device by the vehicle-side communication section. The frequency setting section sets a communication frequency having a higher priority order as the communication frequency to be designated to the portable device at each checkup timing in performing the checkup operation at a regular interval.

Since one communication frequency having a higher priority order is thus set as the communication frequency to be designated to the portable device at each checkup timing, it is only necessary to transmit the request signal including frequency information indicating such a communication frequency once. Since one communication frequency of the higher priority order is designated to the portable device, the communication is made to be less susceptible to influence of factors such as jamming radio waves. Since one request signal including the frequency information indicating the designated frequency is transmitted at each checkup timing, the number of communication is reduced.

An in-vehicle device control system according to a second aspect of the present invention comprises a portable device and a vehicle-side unit. The vehicle-side unit is mounted in a vehicle for performing a checkup operation about the portable device based on mutual communication, in which the portable device returns a response signal in response to a request signal transmitted form the vehicle-side unit, for controlling an in-vehicle device based on a checkup result of the checkup operation, and for switching a communication frequency for the mutual communication if the checkup result indicates an unsuccessful checkup, thereby to perform the checkup operation again. The portable device receives the request signal transmitted from the vehicle-side unit in the mutual communication with the vehicle-side unit. The portable device includes a portable device communication section for returning the response signal including an ID code by a communication frequency designated by the vehicle-side unit. The vehicle-side unit includes a frequency setting section for setting the communication frequency, which is to be designated to the portable device, among a plurality of communication frequencies having respective priority orders, which are set in correspondence to possibility of successful checkup. The vehicle-side unit includes a vehicle-side communication section for performing the mutual communication with the portable device by transmitting to the portable device the request signal including frequency information indicating the communication frequency set by the frequency setting section and receiving the response signal from the portable device. The vehicle-side unit includes a checkup section for performing the checkup operation based on the ID code included in the response signal received from the portable device by the vehicle-side communication section. The frequency setting section sets, until the checkup operation by the checkup section becomes unsuccessful, a communication frequency having a higher priority order as the communication frequency to be designated to the portable device at each checkup timing in performing the checkup operation at a regular interval. The frequency setting section sets a plurality of communication frequencies by switching the communication frequency to be designated to the portable device, when the checkup operation by the checkup section becomes unsuccessful in spite of reception of a radio wave from the portable device by the vehicle-side communication section.

One communication frequency having a higher priority order is set as the communication frequency to be designated to the portable device at each checkup timing, as long as a radio wave is received from the portable device and the checkup operation is successful. It is only necessary to transmit the request signal including the frequency information indicating the communication frequency once. On the other hand, a plurality of communication frequencies is set by switching the communication frequency to be designated to the portable device at each checkup timing, when the checkup operation becomes unsuccessful in spite of reception of a radio wave from the portable device. Thus the request signal including the frequency information indicating the designated communication frequency is transmitted a plurality of times at each checkup timing.

Since one communication frequency of higher priority order is thus designated as long as the checkup operation does not become unsuccessful while receiving the radio wave from the portable device, the communication is made to be less susceptible to influence of factors such as jamming radio waves. Since one request signal including the frequency information indicating the designated communication frequency is transmitted to the portable device at each checkup timing, the number of communication is reduced. On the other hand, since the plurality of communication frequencies is designated when the checkup becomes unsuccessful while receiving the radio wave from the portable device, the communication is made to be less susceptible to influence of factors such as jamming radio waves. Since the request signal including the frequency information indicating the plurality of designated frequencies is transmitted at each checkup timing, the possibility of successful checkup increases.

PREFERRED EMBODIMENT OF THE INVENTION

Embodiments of the present invention will be described below with reference to the drawings.

Figure 1:
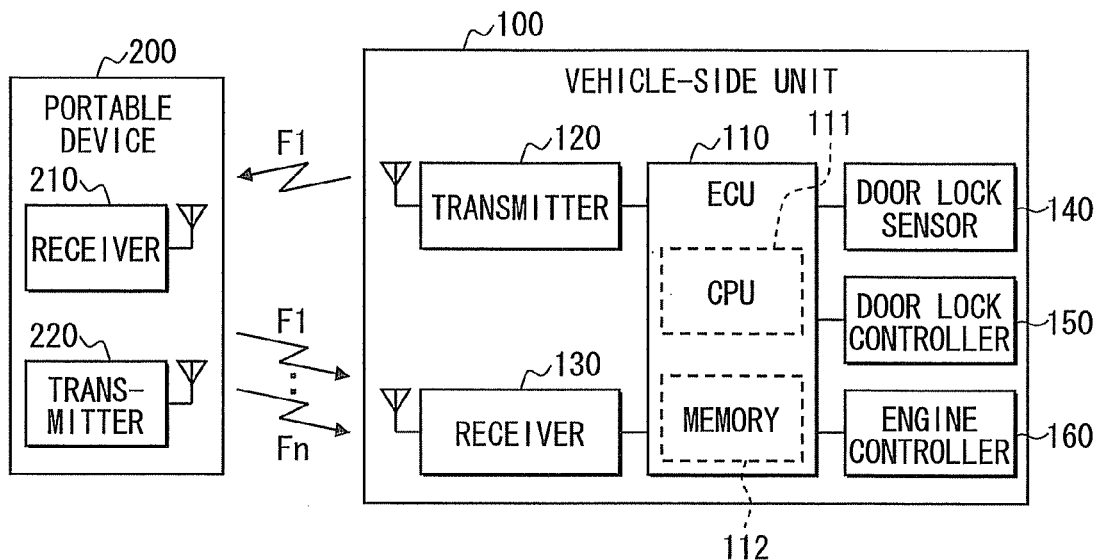
FIG. 1 is a block diagram showing an in-vehicle device control system according to an embodiment of the present invention.

As shown in FIG. 1, an in-vehicle device control system according to an embodiment of the present invention includes a vehicle-side unit 100 and a portable device 200. The in-vehicle device control system performs checkup about the portable device 200 by way of mutual communication (radio communication), in which the portable device 200 transmits a response signal in return to a request signal transmitted from the vehicle-side unit 100 mounted in a vehicle. The in-vehicle device control system controls an in-vehicle device (for example, a door lock mechanism, an engine start mechanism) based on a checkup result of the checkup operation. The in-vehicle device control system performs the checkup again by switching a communication frequency of the mutual communication in case the checkup result indicates an unsuccessful checkup.

The vehicle-side unit 100 is mounted in the vehicle. The vehicle-side unit 100 is provided to control functions of the vehicle-side unit 100 and includes an ECU (electronic control unit) 110, which is equipped with a CPU 111, a memory 112 and the like. In the vehicle-side unit 100, the ECU 110 is connected to a transmitter 120 (vehicle-side communication section), a receiver 130 (vehicle-side communication section), a door lock sensor (detection section), a door lock controller 150 and an engine controller 160. The transmitter 120 is for transmitting a request signal (including frequency information) toward a predetermined detection area outside the vehicle. The receiver 130 is a tuner for receiving a response signal radio-transmitted from the portable device 200. The door lock controller 150 is for controlling and driving a door lock motor, which locks and unlocks a vehicle door. The engine controller 160 is for controlling starting of an engine mounted in the vehicle. The door lock sensor 140 may be a switch or a touch sensor, which is provided on or near an exterior handle of the vehicle door.

The transmitter 120, the door lock sensor 140, the door lock controller 150, the door lock motor and the like are provided for each vehicle door. Although not shown, the vehicle-side unit 100 may further include, for each vehicle door, a lock state detection sensor for detecting lock/unlock state of a vehicle door and a door open detection sensor for detecting an open door.

The memory 112 of the ECU 110 stores an ID code, frequency information (for example, frequencies A and B) and the like. The ID code is for use in the checkup. The frequency information designates a plurality of communication frequencies, which are available in the radio communication from the portable device 200. The plurality of communication frequencies (frequency information) are assigned with respective priorities in the order of possibility of success of checkup and stored in the memory 112 with the respective assigned priorities.

The priority order among the communication frequencies may be determined based on the communication frequency by which the previous checkup has been performed successfully, the communication frequency by which the checkups have been performed successfully more frequently, or the communication frequency by which the checkups have been performed unsuccessfully less frequently. For determining the priority order as described above, it is preferred to store in the memory 112 the communication frequency in the previous successful checkup, the number of past successful checkups with respect to each communication frequency and the number of past unsuccessful checkups with respect to each communication frequency.

The CPU 111 of the ECU 110 outputs a control signal for commanding the transmitter 120 to transmit a request signal based on a signal from the door lock sensor 140. The CPU 111 (as checkup section) also performs checkup of an ID code, which is included in the response signal from the portable device 200, and a pre-registered code based on a signal from the receiver 130 and outputs control signals to the door lock controller 150 and the engine controller 160.

The CPU 111 (as frequency determination section) of the ECU 110 determines the communication frequency, which is to be designated to the portable device 200, among the plurality of communication frequency stored in the memory 112. For example, when the communication frequency to be designated to the portable device 200 is switched because of unsuccessful checkup or performs (polls) the checkup periodically, the CPU 111 (as frequency determination section) determines a communication frequency of higher priority as the communication frequency, which is to be designated to the portable device 200 at each checkup time. The processing operation of the ECU 110 (particularly CPU 111) will be described in detail later.

The transmitter 120 transmits predetermined data by FM modulation or AM modulation of a radio wave, which has a carrier wave of a LF (low frequency) band (for example, about 134 KHz). The receiver 130 is configured to be capable of receiving a radio wave in a predetermined range, for example, UHF (ultra high frequency) band. The receiver 130 has a tuning function for receiving a radio wave of a predetermined frequency with high receiver sensitivity. The receiver 130 receives the response signal by tuning the reception frequency to the communication frequency transmitted from the portable device 200, when the portable device 200 outputs the response signal at the designated communication frequency in the door lock control described later.

The portable device 200 includes a microcomputer (not shown), a receiver section (portable device communication section) 210 and a transmitter section (portable device communication section) 220. The microcomputer controls functions of the portable device 200. The receiver section 210 is for mutual communication with the vehicle-side unit 100 and receives the request signal transmitted from the transmitter 7 by a receiver antenna so that data included in the request signal is inputted to the microcomputer. The transmitter section 220 transmits (returns) through a transmitter antenna the response signal including the data, which is outputted from the microcomputer. The portable device 200 stores an ID code, which identifies the portable device itself.

The transmitter section 220 selects the designated communication frequency among the plurality of communication frequencies for transmitting the response signal and transmits the predetermined data by FM modulation or AM modulation of the radio wave having the carrier wave of the selected communication frequency. When the portable device 200 receives the frequency information indicating the designated communication frequency transmitted from the vehicle-side unit 100, the portable device 200 transmits the response signal to the vehicle-side unit 100 at the communication frequency corresponding to the frequency information. As the communication frequency selectable by the transmitter section 220, radio waves within a range of UHF band, for example, 300 to 400 MHz, is set. The plurality of frequency information (for example, frequency F1 to frequency Fn) is set within this range.

In the in-vehicle device control system, the radio wave in the UHF band, which the portable device 200 uses for transmission, is more susceptible to noise (jamming noise) generated by communication cables, large-scaled display devices and the like than the radio wave in the LF band used by the vehicle-side unit 100. Thus, jamming (that is, communication abnormality) is likely to occur.

It is however possible to reduce influence of factors such as jamming noise, which disturbs radio communication, by switching the frequency designated to the portable device 200 in case of an unsuccessful checkup.

In case of transmitting (polling) the request signal from the vehicle to the portable device 200 periodically for requesting transmission of the response signal, it is also possible to reduce adversary influence of the factors such as jamming radio waves, which disturb radio communication, by designating the plurality of communication frequencies. In case of transmitting (polling) the request signal at the fixed interval, however, the request signal need be transmitted a plurality of times periodically. As a result, to make the radio communication to be less susceptible to adversary factors such as jamming radio waves and the like, the number and time of communications will increase and hence current consumption will also increase. The request signal is transmitted periodically from the vehicle to the portable device in most instances under a condition that the vehicle is parked and at rest. If the current consumption increases under such a condition, a battery will run out.

According to the embodiment, in transmitting the request signal periodically, the current consumption is suppressed by reducing the influence of factors such as jamming radio waves, which disturb communications. The processing operation of the in-vehicle device control system will be described next with reference to FIGS. 2 and 3. In FIG. 3, (a), (b) and (c) show respective cases, in which the frequency A has the highest priority, the frequency B has the highest priority and the frequency C has the highest priority.

Figure 2:
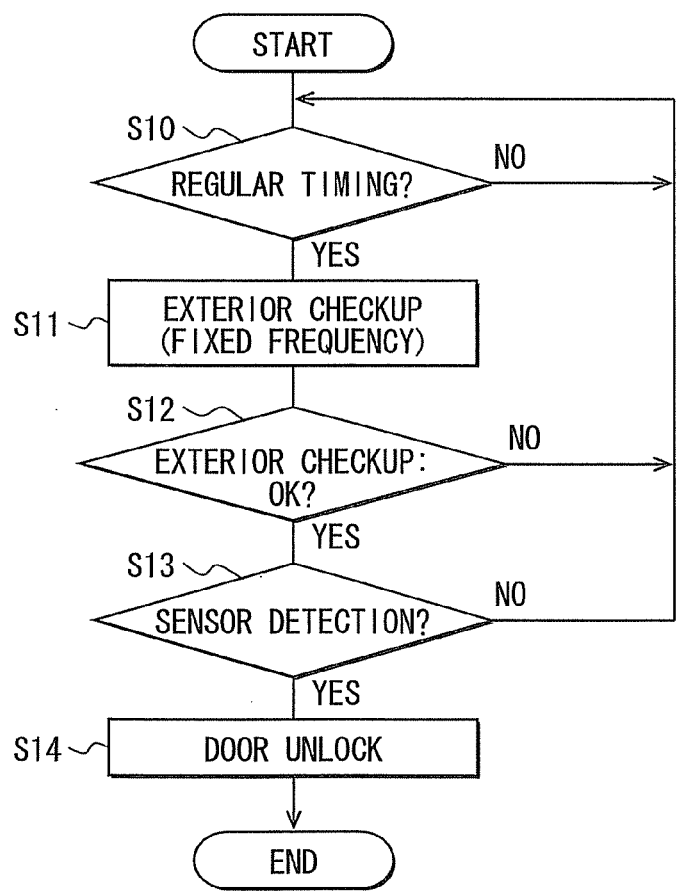
FIG. 2 is a flowchart showing a processing operation of the in-vehicle device control system according to the embodiment of the present invention.
Figure 3:
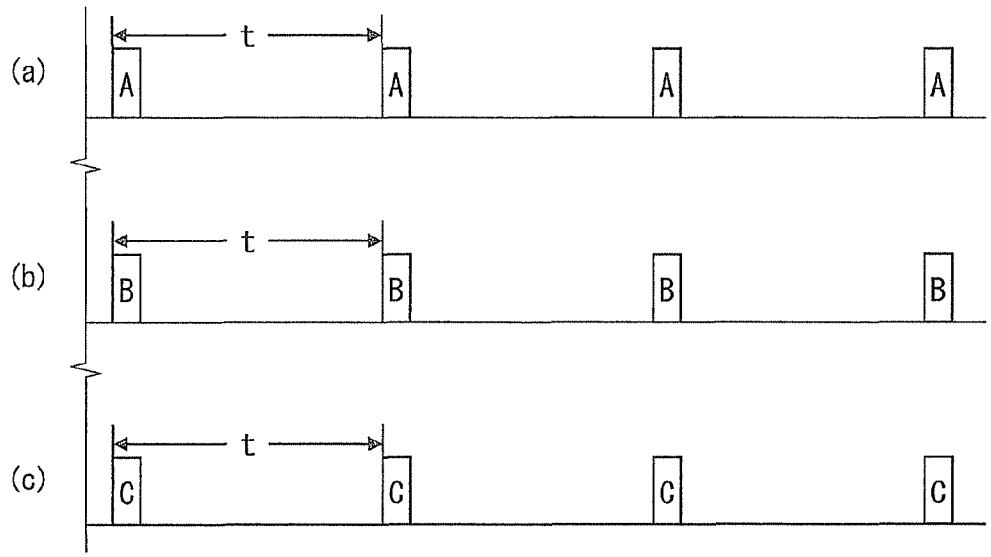
FIG. 3 is a time chart showing transmission timing of a request signal transmitted in the in-vehicle device control system according to the embodiment of the present invention.

First at step S10 in FIG. 2, the CPU 111 checks whether it is a regular timing t. This is for checking whether it is a checkup timing, that is, whether it is the timing to transmit the request signal to the portable device 200. If it is determined that it is the regular timing, step S11 is executed. If it is determined that it is not the regular timing, step S10 is repeated.

At step S11, the CPU 111 performs an exterior checkup. In this step, the CPU 111 (as frequency determination section) determines a communication frequency of high priority as the communication frequency designated to the portable device 200. The request signal including the frequency information is transmitted to the portable device 200 by using the transmitter 120 (as vehicle-side communication section). The frequency information indicates the determined communication frequency. The portable device 200 (as portable device communication section) transmits the response signal at the communication frequency designated by the vehicle-side unit 100, when the response signal is transmitted in response to the received request signal.

The CPU 111 sets the communication frequency, which is to be designated, to the frequency A, if the priority of the frequency A is the highest. Thus, as shown in (a) of FIG. 3, the request signal including the frequency information indicating the frequency A is transmitted. The CPU 111 sets the communication frequency, which is to be designated, to the frequency B, if the priority of the frequency B is the highest. Thus, as shown in (b) of FIG. 3, the request signal including the frequency information indicating the frequency B is transmitted. The CPU 111 sets the communication frequency, which is to be designated, to the frequency C, if the priority of the frequency C is the highest. Thus, as shown in (c) of FIG. 3, the request signal including the frequency information indicating the frequency C is transmitted.

At step S12, the CPU 111 (as checkup section) checks whether the exterior checkup is OK. That is, it is checked whether the ID code included in the received response signal and the ID code stored in the memory 112 satisfies a predetermined correspondence relation (for example, agreement: checkup OK) or not (checkup NG). If the checkup determination by the CPU 111 is OK (YES, that is, successful checkup), step S13 is executed. If the checkup determination is NG (NO, that is, unsuccessful checkup), step S10 is repeated.

The checkup NG indicates that the checkup is not successful. This determination arises, when no response signal has been received within a fixed time period after transmission of the request signal, or when the ID code included in the received response signal and the ID code stored in the memory 112 of the ECU 110 are not in the predetermined correspondence relation (for example, agreement). The checkup OK indicates that the checkup is successful. This determination arises, when the response signal has been received within the fixed time period after transmission of the request signal and the ID code included in the received response signal and the ID code stored in the memory 112 of the ECU 110 are in the predetermined correspondence relation (for example, agreement).

At step S13, the CPU 111 checks whether the door lock sensor 140 outputs a sensor detection. That is, it is checked whether a user has manipulated the door lock sensor 140 for inputting a command of unlocking the vehicle door. If the sensor detection is present (that is, the door lock sensor 140 has been manipulated by the user), step S14 is executed. If the sensor detection in not present (that is, the door lock sensor 140 has not been manipulated by the user), step 10 is repeated.

At step S14, the CPU 111 outputs to the door lock controller 150 a control signal, which commands unlocking of the vehicle door, so that the vehicle door is unlocked.

The CPU 111 thus transmits the request signal including the frequency information, which indicates only one communication frequency having the highest priority, periodically (at regular time interval t). Since one communication frequency of higher priority is designated to the portable device 200, the communication is made to be less susceptible to influence of factors such as jamming radio waves. Since one request signal including the frequency information indicating the designated frequency is transmitted at each checkup timing, the number of communication is reduced.

First Modified Embodiment

Figure 4:
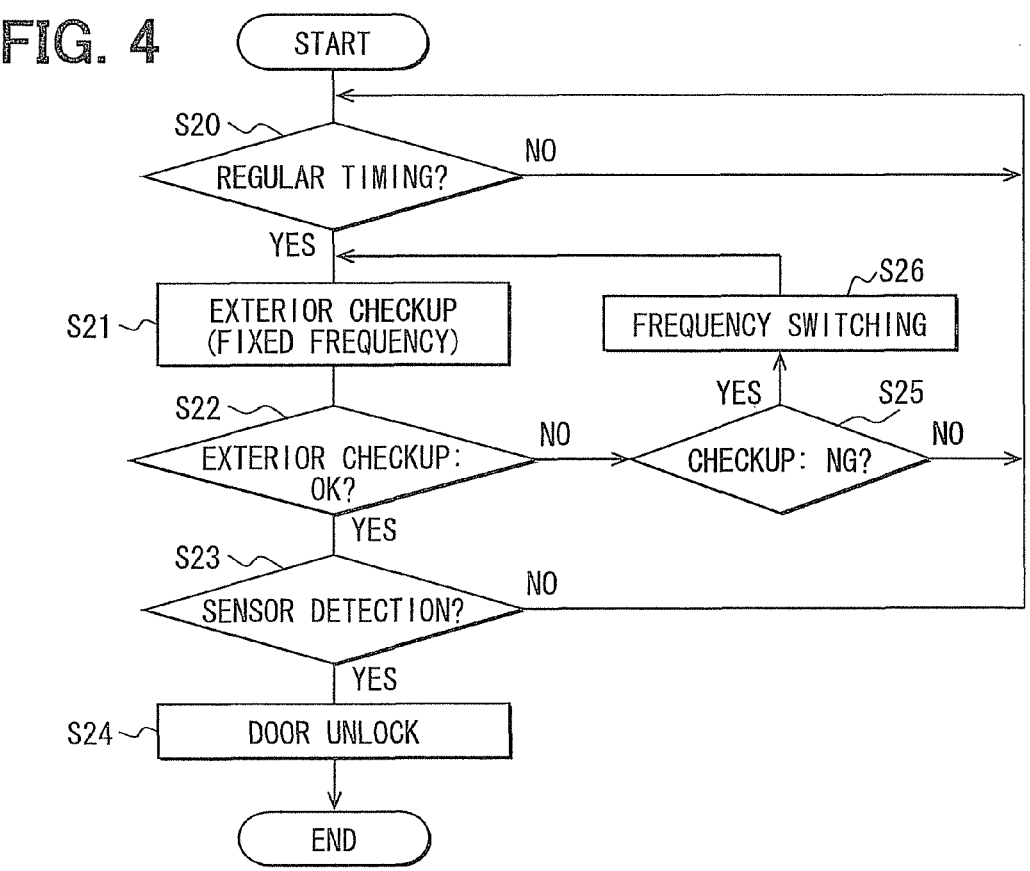
FIG. 4 is a flowchart showing a processing operation of an in-vehicle device control system according to a first modified embodiment of the present invention.
Figure 5:
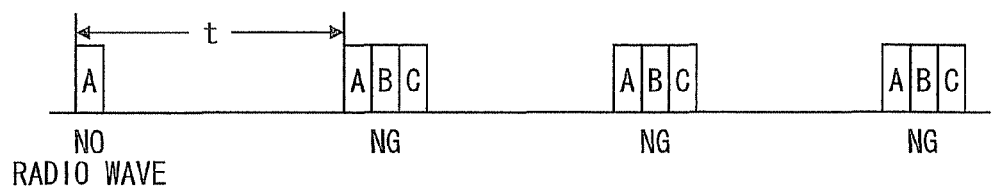
FIG. 5 is a time chart showing transmission timing of a request signal transmitted in the in-vehicle device control system according to the first modified embodiment of the present invention.

The checkup may become unsuccessful in some places or time zones, even if one communication frequency to be designated to the portable device 200 is set to the frequency having high priority as exemplified in the embodiment. As a first modified embodiment, as shown in FIGS. 4 and 5, it is possible to switch the communication frequency designated to the portable device 200 when the checkup is unsuccessful.

The processing operation of the in-vehicle device control system is described with reference to a flowchart shown in FIG. 4.

At step S20, the CPU 111 checks whether it is the regular timing t. This is for checking whether it is the checkup timing, that is, whether it is the timing to transmit the request signal to the portable device 200. If it is determined that it is the regular timing, step S21 is executed. If it is determined that it is not the regular timing, step S20 is repeated.

At step S21, the CPU 111 performs the exterior checkup. In this step, the CPU 111 (as frequency determination section) determines one communication frequency of high priority as the communication frequency designated to the portable device 200, until the checkup performed by receiving the radio wave from the portable device 200 becomes NG. Although described later, the communication frequency designated to the portable device 200 is set to other communication frequencies, after the checkup performed by receiving the radio wave from the portable device 200 has become NG.

The request signal including the frequency information is transmitted to the portable device 200 by using the transmitter 120 (as vehicle-side communication section). The frequency information indicates the determined communication frequency. The device 200 (as portable device communication section) transmits the response signal at the communication frequency designated by the vehicle-side unit 100, when the response signal is transmitted in response to the received request signal.

The CPU 111 sets the communication frequency, which is to be designated, to the frequency A, if the priority of the frequency A is the highest. Thus, the request signal including the frequency information indicating the frequency A is transmitted. The communication frequency, which is to be designated, is set to the frequency B, if the priority of the frequency B is the highest. Thus, the request signal including the frequency information indicating the frequency B is transmitted. Similarly, the communication frequency, which is to be designated, is set to the frequency C, if the priority of the frequency C is the highest. Thus, the request signal including the frequency information indicating the frequency C is transmitted.

At step S22, the CPU 111 (as checkup section) checks whether the exterior checkup is OK. That is, it is checked whether the ID code included in the received response signal and the ID code stored in the memory 112 satisfies the predetermined correspondence relation (for example, agreement) or not. If the checkup determination by the CPU 111 is OK, step S23 is executed. If the checkup determination is NG, step S25 is executed.

The checkup NG indicates that the checkup is not successful. This determination arises, when no response signal has been received within the fixed time period after transmission of the request signal, or when the ID code included in the received response signal and the ID code stored in the memory 112 of the ECU 110 are not in the predetermined correspondence relation (for example, agreement). The checkup OK indicates that the checkup is successful. This determination arises, when the response signal has been received within the fixed time period after transmission of the request signal and the ID code included in the received response signal and the ID code stored in the memory 112 of the ECU 110 are in the predetermined correspondence relation (for example, agreement).

If the exterior checkup at step S22 is determined to be NG, it is likely that no response signal is received from the portable device 200 or the ID code included in the received response signal and the ID code stored in the memory of the ECU 110 are not in the predetermined correspondence relation (for example, agreement).

In case that the exterior checkup results in NG determination because of no reception of the response signal from the portable device 200, it is likely that the user carrying the portable device 200 is not present around the vehicle (in a predetermined detection area outside the vehicle). In case that the exterior checkup results in NG determination with reception of some radio wave from the portable device 200, it is likely that the response signal is disturbed by adversary factors such as jamming radio waves. In such a case, it is desirable to switch a transmission frequency, at which the portable device 200 transmits the response signal. That is, it is desirable to switch the communication frequency designated to the portable device 200. Thus, the checkup NG includes one case, which needs switching of the communication frequency, and the other case, which does not need such switching of communication frequency.

At step 25, therefore, it is checked whether the checkup NG indicates that the communication frequency is switched (switching checkup NG determination). That is, it is checked whether the checkup NG results from no reception of response signal or results from other causes while receiving a response signal (some radio waves from the portable device 200). If it is determined that the checkup NG indicates that the communication frequency should be switched, step S26 is executed. If it is not so determined, step S20 is repeated.

The checkup NG (switching checkup NG), which indicates that the communication frequency should be switched, corresponds to a case (radio wave checkup NG), in which the ID code included in the signal received from the portable device 200 and the ID code stored in the memory 112 of the ECU 110 are not in the predetermined correspondence relation (for example, agreement) although some radio wave has been received from the portable device 200. The switching of the communication frequency should also be made, when a normal bit is not found (bit checkup NG) in the radio wave received from the portable device 200, when the predetermined correspondence relation (for example, agreement) is not satisfied (data checkup NG) although the response signal has received, or when some of the response signals has not been received (command checkup NG) in case that the plurality of request signals have been transmitted.

At step S26, the CPU 111 (frequency setting section) switches the communication frequency, which is designated to the portable device 200, if the check result is the switching checkup NG determination. In this first modified example, the CPU 111 (frequency setting section) sets in addition to the frequency A, from only the frequency A (highest in priority), other communication frequencies B and C of high priorities as the communication frequency to be designated to the portable device 200. As shown in FIG. 5, a plurality of request signals including frequency information, which indicates the frequency A, the frequency B and the frequency C.

At step S23, the CPU 111 checks whether the door lock sensor 140 outputs a sensor detection. That is, it is checked whether the user has manipulated the door lock sensor 140 for inputting the command of unlocking the vehicle door. If the sensor detection is present (that is, the door lock sensor 140 has been manipulated by the user), step S24 is executed. If the sensor detection in not present (that is, the door lock sensor 140 has not been manipulated by the user), step 20 is repeated.

At step S24, the CPU 111 outputs to the door lock controller 150 a control signal, which commands unlocking of the vehicle door, so that the vehicle door is unlocked.

The CPU 111 thus transmits (polls) the request signal including the frequency information, which indicates only one communication frequency having the highest priority, at regular timing t (at a fixed interval) until the switching checkup result becomes NG. It is therefore necessary to transmit only once the request signal including the frequency information indicating such a communication frequency at each checkup timing. If the checkup becomes unsuccessful although the radio wave has been received from the portable device 200, the plurality of communication frequencies is set by switching the communication frequency to be designated to the portable device 200 at the regular timing t (at a fixed interval). As a result, the request signal including the frequency information indicating the communication frequency at each checkup timing.

Since one communication frequency of higher priority is designated to the portable device 200 as long as the checkup does not become unsuccessful while receiving the radio wave from the portable device 200, the communication is made to be less susceptible to influence of factors such as jamming radio waves. Since one request signal including the frequency information indicating the designated frequency is transmitted at each checkup timing, the number of communication is reduced. Since the plurality of communication frequencies is designated to the portable device 200 when the checkup becomes unsuccessful while receiving the radio wave from the portable device 200, the communication is made to be less susceptible to influence of factors such as jamming radio waves. Since the request signal including the frequency information indicating the plurality of designated frequencies is transmitted at each checkup timing, the possibility of successful checkup increases.

Although the communication frequency is switched to the plurality of frequencies in switching the communication frequency in the first modified embodiment, the present invention is not limited to such an example. It is only required that the CPU 111 (frequency setting section) switches the communication frequency when the request signal is transmitted at the regular timing t (polling at a fixed interval), if the checkup becomes unsuccessful although the radio wave has been received from the portable device 200.

That is, if the checkup results in the NG determination (unsuccessful) while receiving the radio wave from the portable device 200, the communication frequency designated to the portable device 200 is switched. Then, at the checkup timing, the request signal including the frequency information indicating the switched communication frequency is transmitted once. The possibility of successful checkup is thus increased by switching the communication frequency, which is to be designated to the portable device, when the checkup becomes unsuccessful in spite of reception of the radio wave from the portable device 200. After the communication frequency to be designated to the portable device has been switched, the request signal including the frequency information indicating only one communication frequency is transmitted. As a result, the number of communications is suppressed from increasing.

Second Modified Embodiment

Although the radio wave checkup NG, the bit reception checkup NG, the data reception checkup NG and the command checkup NG are referred to as one example of the switching checkup NG in the first modified embodiment, the present invention is not limited to such an example.

Figure 6:
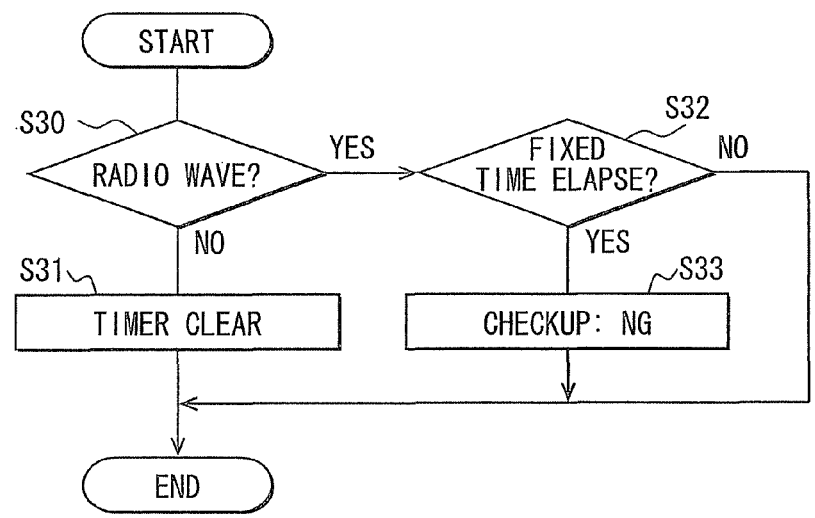
FIG. 6 is a flowchart showing switching checkup NG determination processing executed in an in-vehicle device control system according to a second modified embodiment of the present invention.

A second modified embodiment is described, as another example of the switching checkup NG determination processing (determination processing at step S25 in FIG. 4), with reference to FIG. 6.

At step S30, the CPU 111 checks whether the radio wave of the portable device 200 has been received by the receiver 130 under a state of the exterior checkup NG. If it is determined that the radio wave is present (received), step S32 is executed. If it is determined that no radio wave is present (received), step S31 is executed. At step S31, the CPU 111 clears a timer and ends this processing.

At step S32, the CPU 111 checks whether more than a fixed time has elapsed after reception of the radio wave from the portable device 200. If it is determined that the fixed time has elapsed, the switching checkup is determined to be NG (step S33). If it is determined that the fixed time has not elapsed yet, this processing is ended. That is, if the determination of reception of the radio wave continues for more than the fixed time under the state of exterior checkup NG, a switching checkup is determined to be NG (step S33). If it does not continue for more than the fixed time, this processing is ended.

It is thus possible to determine the switching checkup NG if the radio wave from the portable device 200 continues for more than the fixed time under the exterior checkup NG determination. That is, the switching checkup NG may be determined, when the switching checkup NG (provisional switching checkup NG) with the reception of radio wave from the portable device 200 continues for more than the fixed time.

In the second modified embodiment, it is also possible to check under the exterior checkup NG whether the bit reception continues for the fixed time, whether the data reception continues for the fixed time or whether the command reception continues for the fixed time.

Third Modified Embodiment

In the first modified embodiment, the radio wave checkup NG, the bit reception checkup NG, the data reception checkup NG and the command checkup NG are referred to as an example of the switching checkup NG. The present invention is not limited to such an example.

Figure 7:
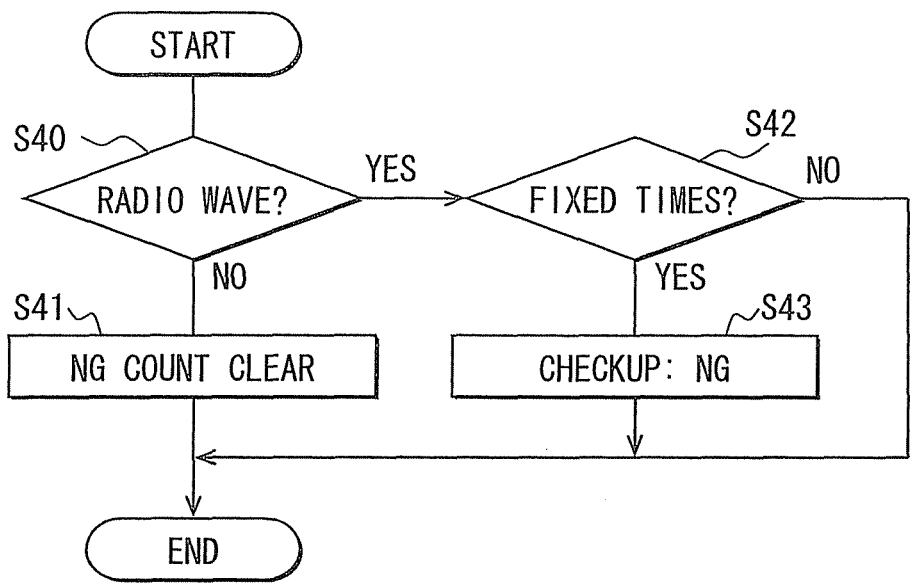
FIG. 7 is a flowchart showing switching checkup NG determination processing executed in an in-vehicle device control system according to a third modified embodiment of the present invention.

A third modified embodiment is described, as another example of the switching checkup NG determination processing (determination processing at step S25 in FIG. 4), with reference to FIG. 7.

At step S40, the CPU 111 checks whether the radio wave of the portable device 200 has been received by the receiver 130 under a state of the exterior checkup NG. If it is determined that the radio wave is present (received), step S42 is executed after counting up a provisional switching checkup NG. If it is determined that no radio wave is present (received), step S41 is executed. At step S41, the CPU 111 clears the number of times of the provisional switching checkup NG and ends this processing. The CPU 111 counts the number of times (the number of times of the provisional switching checkup NG) and stores it in the memory 112, when the radio wave of the portable device 200 has been received by the receiver 130 in the state of the exterior checkup NG.

At step S42, the CPU 111 checks whether the radio wave of the portable device 200 has been received for more than a fixed number of times under the state of the exterior checkup NG. That is, it is checked whether the number of times of the provisional switching checkup result has reached the fixed number of times. If it is determined that the fixed number of times has been attained, the switching checkup is determined to be NG (step S43). If it is determined that the fixed number of times has not been attained yet, this processing is ended.

It is thus possible to determine the switching checkup NG if the radio wave from the portable device 200 continues to be present the fixed number of times under the exterior checkup NG determination. That is, the switching checkup NG may be determined when the switching checkup NG (provisional switching checkup NG) indicating the reception of radio wave from the portable device 200 continues the fixed number of times under the state of the exterior checkup NG.

In the third modified embodiment, it is also possible to check under the exterior checkup NG, whether the bit reception continues the fixed number of times, whether the data reception continues the fixed number of times or whether the command reception continues the fixed number of times.

Fourth Embodiment

In the first modified embodiment, the radio wave checkup NG, the bit reception checkup NG, the data reception checkup NG and the command checkup NG are referred to as an example of the switching checkup NG. The present invention is not limited to such an example.

Figure 8:
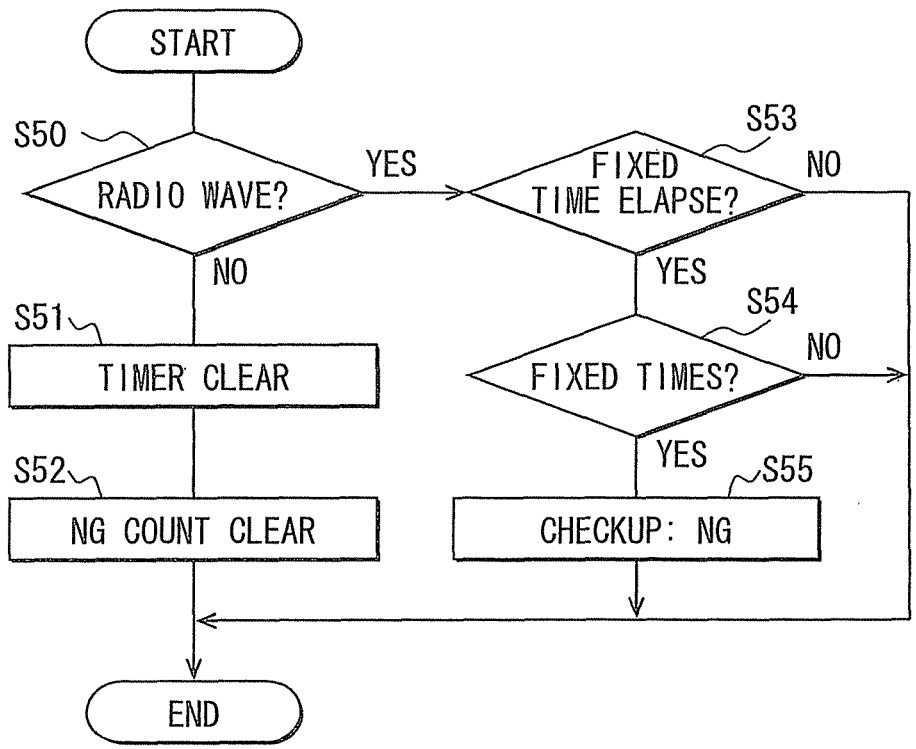
FIG. 8 is a flowchart showing switching checkup NG determination processing executed in an in-vehicle device control system according to a fourth modified embodiment of the present invention.

A fourth modified embodiment is described, as another example of the switching checkup NG determination processing (determination processing at step S25 in FIG. 4), with reference to FIG. 8.

At step S50, the CPU 111 checks whether the radio wave of the portable device 200 has been received by the receiver 130 under a state of the exterior checkup NG. If it is determined that the radio wave is present (received), step S53 is executed after counting up the provisional switching checkup NG. If it is determined that no radio wave is present (received), step S51 is executed.

The CPU 111 clears a timer at step S51 and clears the number of times of the provisional switching checkup NG at step S52. The CPU 111 ends this processing after step S52. The CPU 111 counts the number of times (the number of times of the provisional switching checkup NG) and stores it in the memory 112, when the radio wave of the portable device 200 has been received by the receiver 130 in the state of the exterior checkup NG.

At step S53, the CPU 111 checks whether more than the fixed time has elapsed after reception of the radio wave from the portable device 200. If it is determined that the fixed time has elapsed, step S54 is executed. If it is determined that the fixed time has not elapsed yet, this processing is ended.

At step S54, the CPU 111 checks whether the radio wave of the portable device 200 has been received for more than the fixed number of times under the state of the exterior checkup NG. That is, it is checked whether the number of times of the provisional switching checkup NG has reached the fixed number of times. If it is determined that the fixed number of times has been attained, it means that the fixed time has elapsed after reception of the radio wave from the portable device 200 and the number of times of reception of the radio wave from the portable device 200 has attained the fixed number of times. As a result, the switching checkup is determined to be NG (step S55). If it is determined that the fixed number of times has not been attained yet, this processing is ended.

It is thus possible to determine the switching checkup NG when the reception of the radio wave from the portable device 200 continues the fixed number of times within the fixed time in the state of the exterior checkup NG. That is, it is possible to determine the switching checkup NG when the switching checkup NG (provisional switching checkup NG) of reception of the radio wave from the portable device 200 continues the fixed number of times within the fixed time in the state of the exterior checkup NG.

In the fourth modified embodiment, it is also possible to check under the exterior checkup NG, whether the bit reception continues the fixed number of times, whether the data reception continues the fixed number of times or whether the command reception continues the fixed number of times.

Fifth Modified Embodiment

A fifth modified embodiment, which is directed to the switching timing for switching the communication frequency to be designated to the portable device 200 as shown in the first modified embodiment to the fourth modified embodiment, is described with reference to FIGS. 9 and 10.

Figure 9:
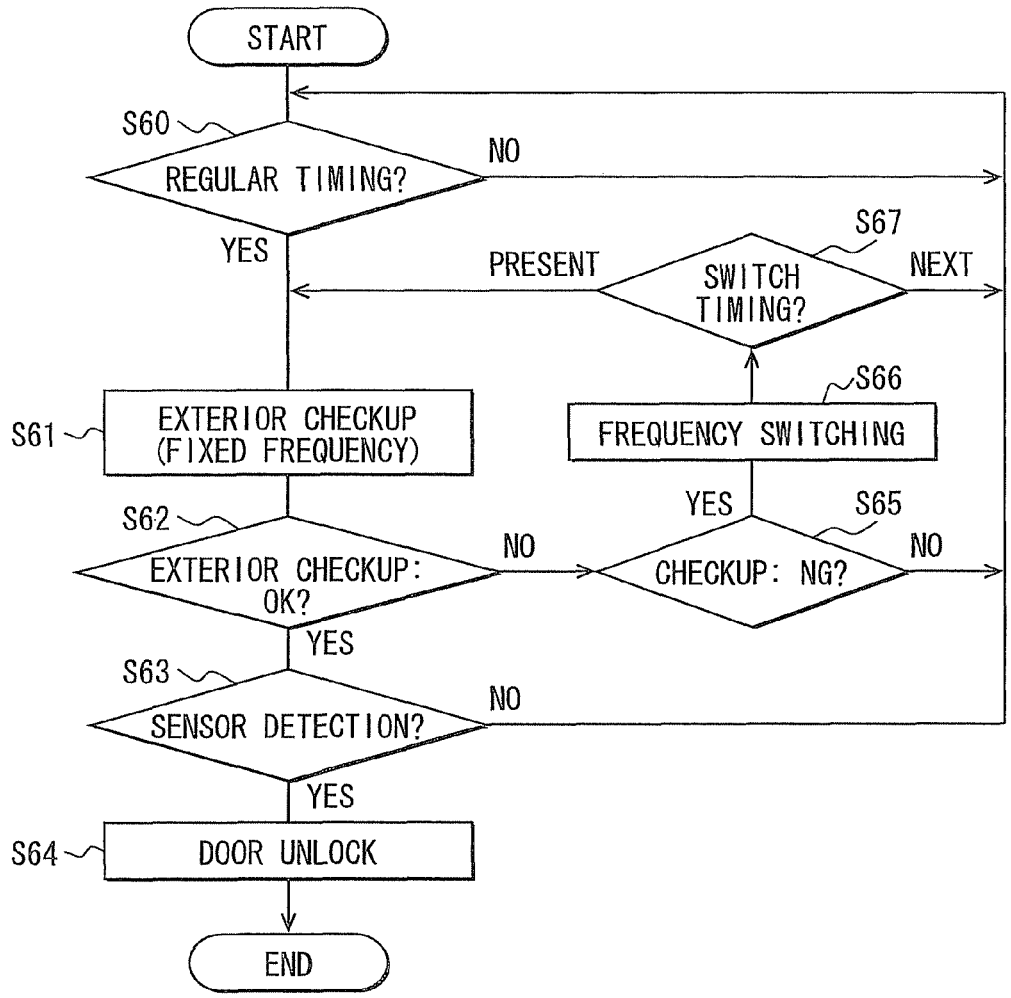
FIG. 9 is a flowchart showing a processing operation of an in-vehicle device control system according to a fifth modified embodiment of the present invention.

Steps S60 to S66 in FIG. 9 are similar to steps S20 to S26 in FIG. 4 and hence details of such steps are not described.

At step S67, the CPU 111 checks whether the switching timing is at present or next. If it is determined to be at present, step S61 is executed. If it is determined to be next, step S60 is executed.

Figure 10:
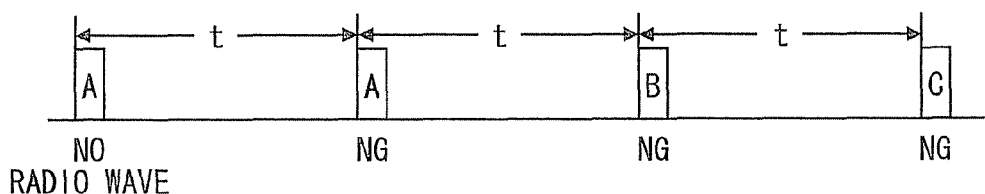
FIG. 10 is a time chart showing transmission timing of a request signal transmitted in the in-vehicle device control system according to a fifth modified embodiment of the present invention.

If the switching time is determined to be next, the CPU 111 (frequency setting section) switches the communication frequency, by which the request signal is transmitted at the next checkup timing following the switching checkup NG, as shown in FIG. 10.

Since the number of times of transmission of the request signals is suppressed from increasing, the current consumption is also suppressed from increasing.

Sixth Modified Embodiment

Figure 11:
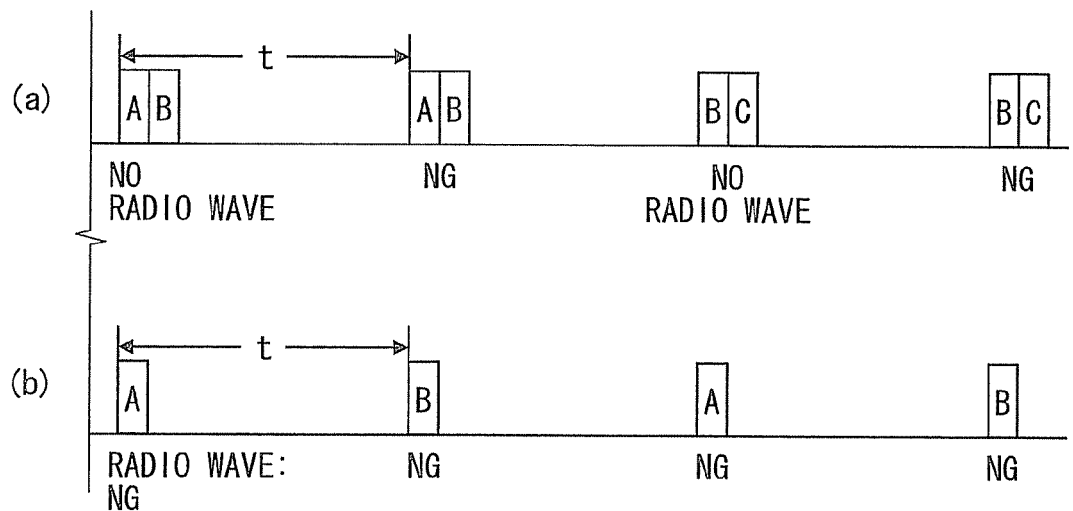
FIG. 11 is a time chart showing transmission timing of a request signal transmitted in an in-vehicle device control system according to a sixth modified embodiment of the present invention.

As a sixth modified embodiment, it is possible to transmit the request signal at transmission timing shown in FIG. 11 in the in-vehicle device control system.

As shown by (a) in FIG. 11, the CPU 111 (frequency setting section) sets two communication frequencies of high priority order as the communication frequency, which is designated to the portable device 200 at each checkup timing (regular timing t), in switching the communication frequency. That is, since two communication frequencies of high priority order are set at every regular timing t (at fixed interval), the request signal including the frequency information indicating the communication frequency is transmitted two times at each checkup timing. As a result, it is made more probable that the checkup becomes successful.

As shown by (b) in FIG. 11, the CPU 111 (frequency setting section) may switch the communication frequency between two communication frequencies of high priority order in switching the communication frequency. That is, in switching the communication frequency to be designated to the portable device 200, the communication frequency is switched to either one of the two communication frequencies of high priority order and the request signal including the frequency information indicating such a communication frequency is transmitted once at each checkup timing. As a result, it is made more probable that the checkup becomes successful.

Seventh Embodiment

Figure 12:
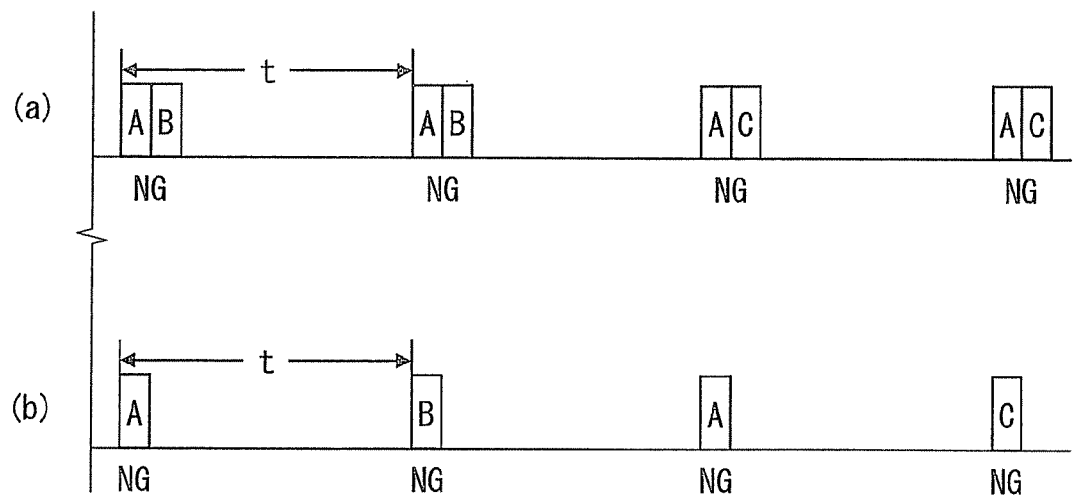
FIG. 12 is a time chart showing transmission timing of a request signal transmitted in an in-vehicle device control system according to a seventh modified embodiment of the present invention.

As a seventh modified embodiment, it is possible to transmit the request signal at transmission timing shown in FIG. 12 in the in-vehicle device control system.

As shown by (a) in FIG. 12, the CPU 111 (frequency setting section) sets one of the two communication frequencies (frequency A in this embodiment), which has higher priority order, as a main communication frequency. The main frequency is fixed and the other communication frequency is switched.

Even if the communication frequency, which will provide more successful checkup, the checkup may become unsuccessful depending on the timing of communication (checkup). It is thus made more probable that the checkup becomes successful by fixing the main communication frequency and switching the other communication frequency.

As shown by (b) in FIG. 12, the CPU 111 (frequency setting section) may set one of the communication frequencies (frequency A in this embodiment) of higher priority order as the main communication frequency and switch the communication frequency between the main frequency and the other communication frequency in switching the two communication frequencies of high priority orders.

By thus setting the main communication frequency once in switching the communication frequency two times, it is made more probable that the checkup becomes successful.

Eighth Modified Embodiment

Figure 13:
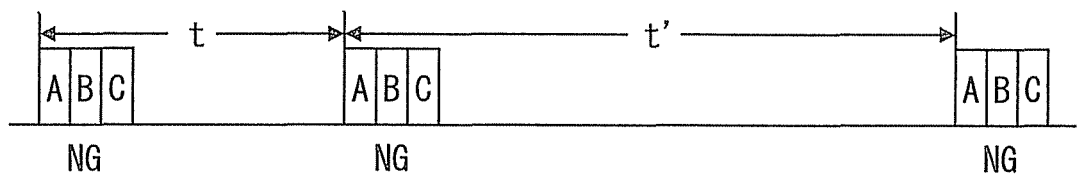
FIG. 13 is a time chart showing transmission timing of a request signal transmitted in an in-vehicle device control system according to an eighth modified embodiment of the present invention.

As an eighth modified embodiment, it is possible to transmit the request signal at transmission timing shown in FIG. 13 in the in-vehicle device control system.

As shown in FIG. 13, the CPU 111 (vehicle-side communication section) prolongs an interval (t'), by which the request signal is transmitted to the portable device 200, after an elapse of a certain fixed time from the start of checkup performed at every regular timing t (at regular interval).

Thus, the checkup timing itself is reduced and hence the current consumption is reduced.

The CPU 111 may stop transmission of the request signal after an elapse of a certain fixed time from prolongation of the interval (t'), by which the request signal is transmitted to the portable device 200.

Ninth Modified Embodiment

Figure 14:
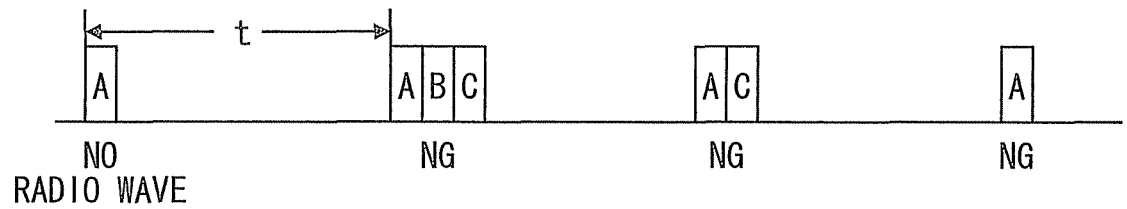
FIG. 14 is a time chart showing transmission timing of a request signal transmitted in an in-vehicle device control system according to a ninth modified embodiment of the present invention.

As a ninth modified embodiment, it is possible to transmit the request signal at transmission timing shown in FIG. 14 in the in-vehicle device control system.

As shown in FIG. 14, in switching the communication frequency, which is designated to the portable device 200, the CPU 111 (frequency setting section) reduces the number of a plurality of communication frequencies set to be designated to the portable device 200 when the switching checkup becomes NG.

The number of communication is thus reduced and hence the current consumption is reduced.

The foregoing embodiment and its first to ninth modified embodiments may be selectively combined in implementing the invention.

The invention claimed is:

1. An in-vehicle device control system comprising:
a portable device; and
a vehicle-side unit mounted in a vehicle for performing a checkup operation about the portable device based on mutual communication, in which the portable device returns a response signal in response to a request signal transmitted from the vehicle-side unit, for controlling an in-vehicle device based on a checkup result of the checkup operation, and for switching a communication frequency for the mutual communication if the checkup result indicates an unsuccessful checkup, thereby to perform the checkup operation again, wherein
the portable device receives the request signal transmitted from the vehicle-side unit in the mutual communication with the in-vehicle device,
the portable device includes a portable device communication section for returning the response signal including an ID code by using a communication frequency designated by the vehicle-side unit,
the vehicle-side unit includes a frequency setting section for setting the communication frequency, which is to be designated to the portable device, among a plurality of communication frequencies having respective priority orders, which are set in correspondence to possibility of successful checkup,
the vehicle-side unit includes a vehicle-side communication section for performing the mutual communication with the portable device by transmitting to the portable device the request signal including frequency information indicating the communication frequency set by the frequency setting section and receiving the response signal from the portable device,
the vehicle-side unit includes a checkup section for performing the checkup operation based on the ID code included in the response signal received from the portable device by the vehicle-side communication section,
the frequency setting section sets a communication frequency having a higher priority order as the communication frequency to be designated to the portable device at each checkup timing in performing the checkup operation at a regular interval; and
the frequency setting section sets an order of priority based on either one of a frequency which provided a greater number of times of successful checkups and a frequency which provided a less number of times of unsuccessful checkups.

2. An in-vehicle device control system comprising:
a portable device; and
a vehicle-side unit mounted in a vehicle for performing a checkup operation about the portable device based on mutual communication, in which the portable device returns a response signal in response to a request signal transmitted from the vehicle-side unit, for controlling an in-vehicle device based on a checkup result of the checkup operation, and for switching a communication frequency for the mutual communication if the checkup result indicates an unsuccessful checkup, thereby to perform the checkup operation again, wherein
the portable device receives the request signal transmitted from the vehicle-side unit in the mutual communication with the in-vehicle device,
the portable device includes a portable device communication section for returning the response signal including an ID code by using a communication frequency designated by the vehicle-side unit,
the vehicle-side unit includes a frequency setting section for setting the communication frequency, which is to be designated to the portable device, among a plurality of communication frequencies having respective priority orders, which are set in correspondence to possibility of successful checkup,
the vehicle-side unit includes a vehicle-side communication section for performing the mutual communication with the portable device by transmitting to the portable device the request signal including frequency information indicating the communication frequency set by the frequency setting section and receiving the response signal from the portable device,
the vehicle-side unit includes a checkup section for performing the checkup operation based on the ID code included in the response signal received from the portable device by the vehicle-side communication section, and
the frequency setting section sets a communication frequency having a higher priority order as the communication frequency to be designated to the portable device at each checkup timing in performing the checkup operation at a regular interval; and
the vehicle-side communication section prolongs an interval, at which the request signal is transmitted to the portable device, after an elapse of a fixed time from a start of the checkup operation performed at the regular interval.

3. The in-vehicle device control system according to claim 2, wherein:
the vehicle-side communication section stops transmitting the request signal after an elapse of another fixed time following prolongation of the interval.

4. An in-vehicle device control system comprising:
a portable device; and
a vehicle-side unit mounted in a vehicle for performing a checkup operation about the portable device based on mutual communication, in which the portable device returns a response signal in response to a request signal transmitted from the vehicle-side unit, for controlling an in-vehicle device based on a checkup result of the checkup operation, and for switching a communication frequency for the mutual communication if the checkup result indicates an unsuccessful checkup, thereby to perform the checkup operation again, wherein the portable device receives the request signal transmitted from the vehicle-side unit in the mutual communication with the in-vehicle device, the portable device includes a portable device communication section for returning the response signal including an ID code by using a communication frequency designated by the vehicle-side unit, the vehicle-side unit includes a frequency setting section for setting the communication frequency, which is to be designated to the portable device, among a plurality of communication frequencies having respective priority orders, which are set in correspondence to possibility of successful checkup, the vehicle-side unit includes a vehicle-side communication section for performing the mutual communication with the portable device by transmitting to the portable device the request signal including frequency information indicating the communication frequency set by the frequency setting section and receiving the response signal from the portable device, the vehicle-side unit includes a checkup section for performing the checkup operation based on the ID code included in the response signal received from the portable device by the vehicle-side communication section, the frequency setting section sets, until the checkup operation by the checkup section becomes unsuccessful, a communication frequency having a higher priority order as the communication frequency to be designated to the portable device at each checkup timing in performing the checkup operation at a regular interval, and the frequency setting section sets a plurality of communication frequencies by switching the communication frequency to be designated to the portable device, when the checkup operation by the checkup section becomes unsuccessful in spite of reception of a radio wave from the portable device by the vehicle-side communication section.

5. The in-vehicle device control system according to claim 4, wherein:

the frequency setting section sets an order of priority based on either one of a frequency, which provided a successful checkup last time, a greater number of times of successful checkups and a less number of times of unsuccessful checkups.

6. The in-vehicle device control system according to claim 4, wherein:

the checkup section determines that the checkup operation is unsuccessful in response to occurrence of at least one of predetermined states, in which a normal bit is not received in spite of reception of the response signal, the response signal is not in a predetermined correspondence relation relative to a pre-registered signal in spite of reception of the response signal, and the response signal is not received in response to any one of request signals.

7. The in-vehicle device control system according to claim 4, wherein:

the checkup section starts to count time in response to occurrence of at least one of predetermined states, in which a normal bit is not received in spite of reception of the response signal, the response signal is not in a predetermined correspondence relation relative to a pre-registered signal in spite of reception of the response signal, or the response signal is not received in response to any one of request signals; and the checkup section determines that the checkup operation is unsuccessful when a counted time indicating continuation of the at least one of predetermined states is less than a fixed time.

8. The in-vehicle device control system according to claim 7, wherein:

the checkup section clears a counted time when no radio wave is received from the portable device.

9. The in-vehicle device control system according to claim 4, wherein:

the checkup section counts a number of times of occurrence of at least one of predetermined states, in which a normal bit is not received in spite of reception of the response signal, the response signal is not in a predetermined correspondence relation relative to a pre-registered signal in spite of reception of the response signal, or the response signal is not received in response to any one of request signals; and the checkup section determines that the checkup operation is unsuccessful when a counted number of times of the occurrence of at least one of predetermined states reaches a fixed number of times.

10. The in-vehicle device control system according to claim 9, wherein:

the checkup section clears the counted number of time when no radio wave is received from the portable device.

11. The in-vehicle device control system according to claim 4, wherein:

the checkup section starts to count time of continuation and a number of times of occurrence of at least one of predetermined states, in which a normal bit is not received in spite of reception of the response signal, the response signal is not in a predetermined correspondence relation relative to a pre-registered signal in spite of reception of the response signal, or the response signal is not received in response to any one of request signals; and the checkup section determines that the checkup operation is unsuccessful when a counted number of times of the occurrence of at least one of predetermined states reaches a fixed number of times within a fixed time.

12. The in-vehicle device control system according to claim 9, wherein:

the checkup section clears a counted time and the counted number of times when no radio wave is received from the portable device.

13. The in-vehicle device control system according to claim 4, wherein:

the frequency setting section switches, in switching the communication frequency to be designated to the portable device, the communication frequency at a time when the vehicle-side communication section transmits the request signal at a next checkup timing after the checkup section determines that the checkup operation is unsuccessful.

14. The in-vehicle device control system according to claim 4, wherein:

the frequency setting section sets, in switching the communication frequency to be designated to the portable device, two communication frequencies having higher priority orders as the communication frequency to be designated to the portable device at each checkup timing.

15. The in-vehicle device control system according to claim 4, wherein:
the frequency setting section sets one of two communication frequencies having a higher priority order as a main communication frequency, and switches the other one of the two communication frequencies while maintaining the main communication frequency in switching the communication frequency to be designated to the portable device.

16. The in-vehicle device control system according to claim 4, wherein:
the vehicle-side communication section prolongs an interval, at which the request signal is transmitted to the portable device, after an elapse of a fixed time from a start of the checkup operation performed at the regular interval.

17. The in-vehicle device control system according to claim 16, wherein:
the vehicle-side communication section stops transmitting the request signal after an elapse of another fixed time following prolongation of the interval.

18. The in-vehicle device control system according to claim 4, wherein:
the frequency setting section reduces, in switching the communication frequency designated to the communication frequency, a number of the plurality of communication frequencies set to be designated to the portable device when the checkup section determines that the checkup operation is unsuccessful.

19. The in-vehicle device control system according to claim 4, wherein:
the checkup section determines that the checkup operation is unsuccessful because the response signal in the received radio wave is not received from the portable device or because the ID code included in the response signal does not correspond to a predetermined code.

20. The in-vehicle device control system according to claim 19, wherein:
the frequency setting section sets no plurality of communication frequencies when the response signal in the radio wave of the communication frequency designated to the portable device is not received from the portable device.

* * * * *